United States Patent [19]

Bushmitch

[11] Patent Number: 5,928,331

[45] Date of Patent: Jul. 27, 1999

[54] DISTRIBUTED INTERNET PROTOCOL-BASED REAL-TIME MULTIMEDIA STREAMING ARCHITECTURE

[75] Inventor: Dennis Bushmitch, Summit, N.J.

[73] Assignee: Matsushita Electric Industrial Co., Ltd., Osaka, Japan

[21] Appl. No.: 08/960,799

[22] Filed: Oct. 30, 1997

[51] Int. Cl.[6] .................................................. G06F 13/00
[52] U.S. Cl. ........................................................ 709/231
[58] Field of Search ....................... 364/DIG. 1, DIG. 2; 345/330; 370/401, 410, 466, 524; 379/88.13, 908; 707/104; 709/234, 200, 203, 204, 217, 231

[56] References Cited

U.S. PATENT DOCUMENTS

| | | | |
|---|---|---|---|
| 5,724,355 | 3/1998 | Bruno et al. | 370/401 |
| 5,737,531 | 4/1998 | Ehley | 709/231 |
| 5,768,513 | 6/1998 | Kuthgar et al. | 709/204 |
| 5,768,527 | 6/1998 | Zhu et al. | 370/231 |

*Primary Examiner*—Robert B. Harrell
*Attorney, Agent, or Firm*—Harness, Dickley & Pierce P.L.C.

[57] ABSTRACT

Multiple media push engines communicate with the multimedia client through a multi casting network that may incorporate multiple delivery paths. The streaming data representing media selections for delivery are distributed across multiple media push engines using a non-hierarchial coding technique in which the data are represented as a set of substream components, capable of being reconstituted from fewer than all of the components of the original data stream. The higher the number of components used in reconstitution, the higher the quality of service is provided by the reconstituted stream. Admission control to the group multicast session is administered in a distributed fashion, where an admission control unit opens the multicast stream, with all subsequent admission control decisions being made by the media push engines themselves. Substream component data are sent using Real-Time transport protocol while session management and the distributed admission control process are administered under the Real-Time Control Protocol.

15 Claims, 9 Drawing Sheets

DISTRIBUTED INTERNET PROTOCOL-BASED REAL-TIME MULTIMEDIA STREAMING ARCHITECTURE

BACKGROUND AND SUMMARY OF THE INVENTION

The present invention relates generally to networked multimedia systems. More particularly, the invention relates to a media delivery system for delivering media selections to one or more media clients over a multicasting network.

With the explosive growth of the Internet, there is a growing interest in using the Internet and other Internet protocol-based networks to deliver multimedia selections, such as video and audio material. Interactive television, movies on demand, and other multimedia push technologies are among the more promising applications.

The Internet is a connectionless network offering best effort delivery service. Packets of data are routed as datagrams that carry the address of the intended recipient. A specific connection between the sender and the recipient is not required, because all host nodes on the network include the inherent capability to route datagrams from node to node until delivery is effected. This datagram packet delivery scheme is constructed as a best effort delivery system in which the delivery of datagram packets is not guaranteed. Datagram packets may be sent via different routes in the effort to increase the likelihood of delivery. Thus, if one node on the network is experiencing congestion, subsequent datagrams may be alternately routed to avoid the congested node. This means that data datagram packets do not inherently have a guaranteed arrival time. Even packets corresponding to a single message may be received out of order. This fact significantly affects how certain multimedia data are delivered.

In many cases, multimedia data require real-time delivery. In the case of audio or video data, the data stream representing a particular media selection needs to be delivered in the proper time sequence, to allow the user to play back the audio or video selection "live" as it is being sent. Clearly, if the datagram packets are delivered out of order, due to taking different delivery routes, then playback at the multimedia client (e.g., a user's interactive TV) will be jumbled.

The Real-time Protocol (RTP) is a current de facto standard for delivering real-time content over the Internet (or other networks based on an IP protocol). The Real-time Protocol replaces the conventional transmission control protocol (TCP) with a framework that real-time applications can use directly for data transport. Currently, the RTP standard supports a first type of message, namely one for carrying the media content data or streaming data. Typically, a separate protocol, the Real-Time Control Protocol (RTCP) is used with RTP to pass control messages for session management, rate adaptation and the like.

While the Real-time Protocol can be used to deliver multimedia streaming data over computer networks, the existing architecture has not proven robust enough to provide high quality presentation using best effort network services such as those provided by the Internet. The present invention solves this problem by using a distributed media push architecture that is capable of supplying streaming data redundantly from multiple sources and over multiple distribution paths. The media push engines have associated media storage units that store streaming data as non-hierarchial sets of substream components. The components are capable of being reconstituted into a reconstructed stream from fewer than all of the components, such that the higher the number of components used in reconstitution, the higher the quality of the reconstructed stream.

Conventional systems use a hierarchial coding scheme that treats some components as more important than others. Thus, conventional systems typically need to expend considerable resources to guarantee that the more important components are always delivered. In contrast, the media delivery system of the invention uses a non-hierarchial coding scheme, multiple description coding (MDC) that treats all components as equals. Thus, no special resources need to be allocated to ensure that a given set of substream components is delivered. Naturally, the higher number of components delivered, the higher the quality achieved; on the other hand, unlike with conventional hierarchial coding, loss of any given single packet does not appreciably degrade the signal quality.

The distributed media delivery system also employs a distributed admission control system. The media client contacts a single admission control unit to request a given media selection, but thereafter the admission control decisions are handled in distributed fashion by the media push engines themselves. The admission control unit communicates the request to a plurality of media push engines distributed across the network and those push engines individually determine whether they can participate in the multicasting session. Thus, the individual media push engines each evaluate local traffic congestion to determine whether it is capable of supplying the requested data stream. The admission control unit is thus not involved in directly determining which media push engines should be admitted to a multicast group session. The admission control unit simply assigns the multicast group session address and then allows the admission process to proceed autonomously, in a distributed fashion.

For a more complete understanding of the invention, its objects and advantages, reference may be had to the following specification and to the accompanying drawings.

DETAILED DESCRIPTION OF THE PREFERRED EMBODIMENT

Figure 1:
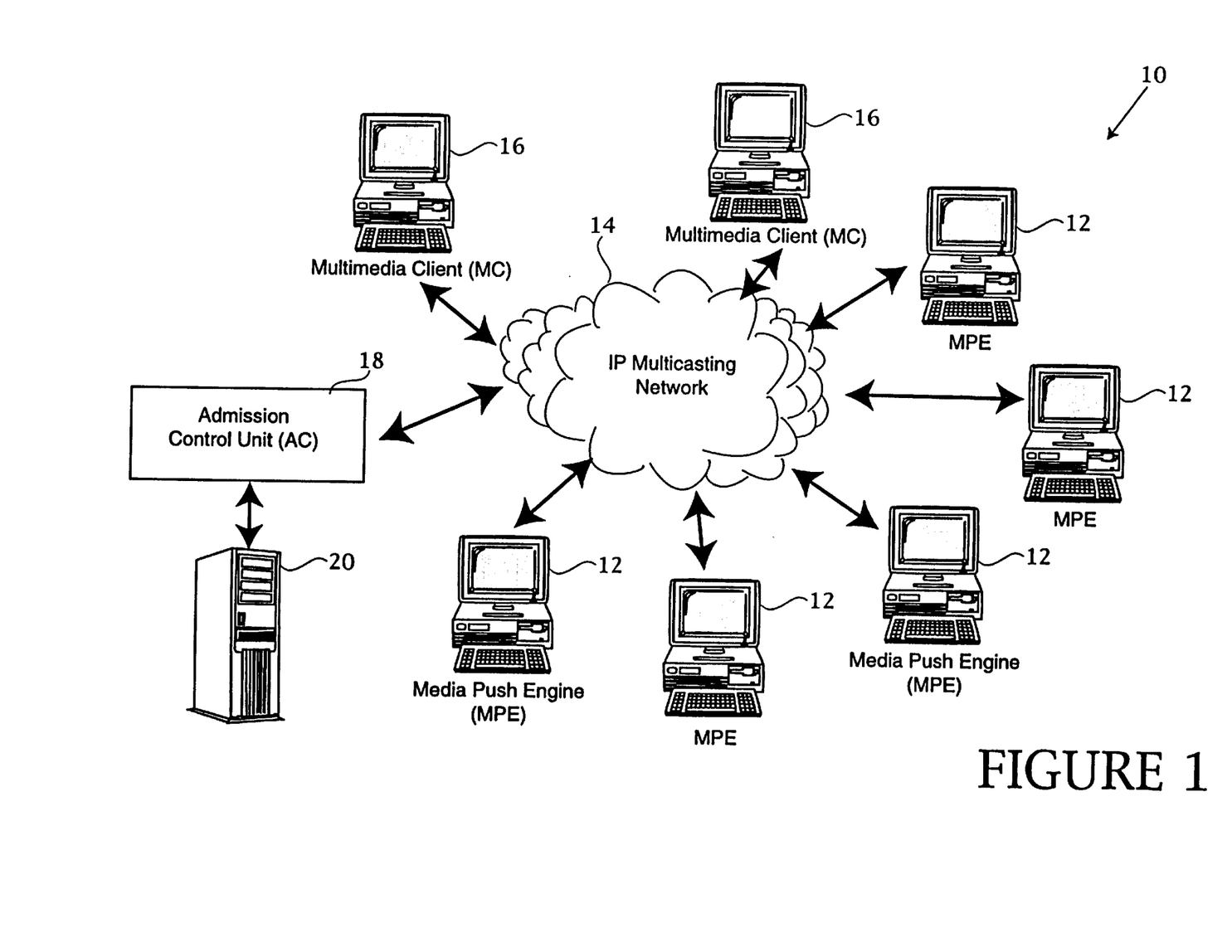
FIG. 1 is a network datagram illustrating a preferred embodiment of the invention.

Referring to FIG. 1, an exemplary distributed networked multimedia system is illustrated at 10. A plurality of media push engines 12 are accessible through the multicasting network 14. The presently preferred embodiment is designed to work over a network employing the Internet protocol (IP); however, the principles of the invention may be readily extended to networks using other protocols. The network 14 is also assessable by one or more multimedia clients 16, as illustrated. An admission control unit 18, accessible through network 14, performs certain admission control functions, primarily to initiate or open a multicast group session. The admission control unit includes a catalog services system 20. The catalog services system contains a database record indicating which multimedia selections are available for delivery by the plurality of media push engines. Although involved in opening a multicast group session, the admission control process is actually performed in a distributed fashion as will be more fully discussed below.

The distributed media delivery system responds to delivery requests from a multimedia client by opening a multicast group session among the media client and those multimedia push engines that have the requested media selection available for delivery. Typically multiple media push engines will participate in simultaneously delivering streaming data corresponding to the requested selection. The multimedia client is a user host that performs the presentation function. It reconstructs a final stream from the various stream components delivered by the participating media push engines. Each media push engine has its own data storage for the stream component data and those data storage systems can be mediated by a suitable distributed file system that provides a mountable and transparent storage and retrieval function.

An important aspect of the distributed media delivery system is the manner in which streaming data are stored on the media push engines. Unlike traditional systems that store multimedia data in a hierarchial fashion, the present invention uses a non-hierarchial coding scheme, referred to here as multiple description coding (MDC). The multiple description coding splits the video and/or audio stream into substreams called components. Each component can then be coded and transmitted over the network independently from all other components. The client software on a multimedia client 16 can assemble a reconstructed stream from any subset of the components. Thus the reconstructed stream can be assembled from fewer than all of the components. The higher the number of components used in reconstruction, the higher the quality of the reconstructed stream.

Using this non-hierarchial coding to deliver streaming data over the inherently unreliable network affords surprisingly robust media delivery, particularly when multiple push engines participate in the delivery. As will be more fully discussed, the media push engines control the multicast group session admission process themselves, in a distributed fashion, adding or subtracting media push engines to the group session as needed to maintain a high quality of services. Thus, when the multicasting network 14 exhibits low traffic congestion, only a few media push engines may be needed to supply all of the components of the MDC-encoded stream. Even if some components are not delivered in a timely fashion, the multimedia client will nevertheless be able to reconstruct the stream for presentation (with some degree of degraded quality). If the network traffic congestion is high, the media push engines negotiate with one another to add additional media push engines. Because the admission control process is distributed, individual media push engines are able to assess their own local traffic congestion and will thus participate in the group session, or not, depending on local traffic conditions.

Figure 2:
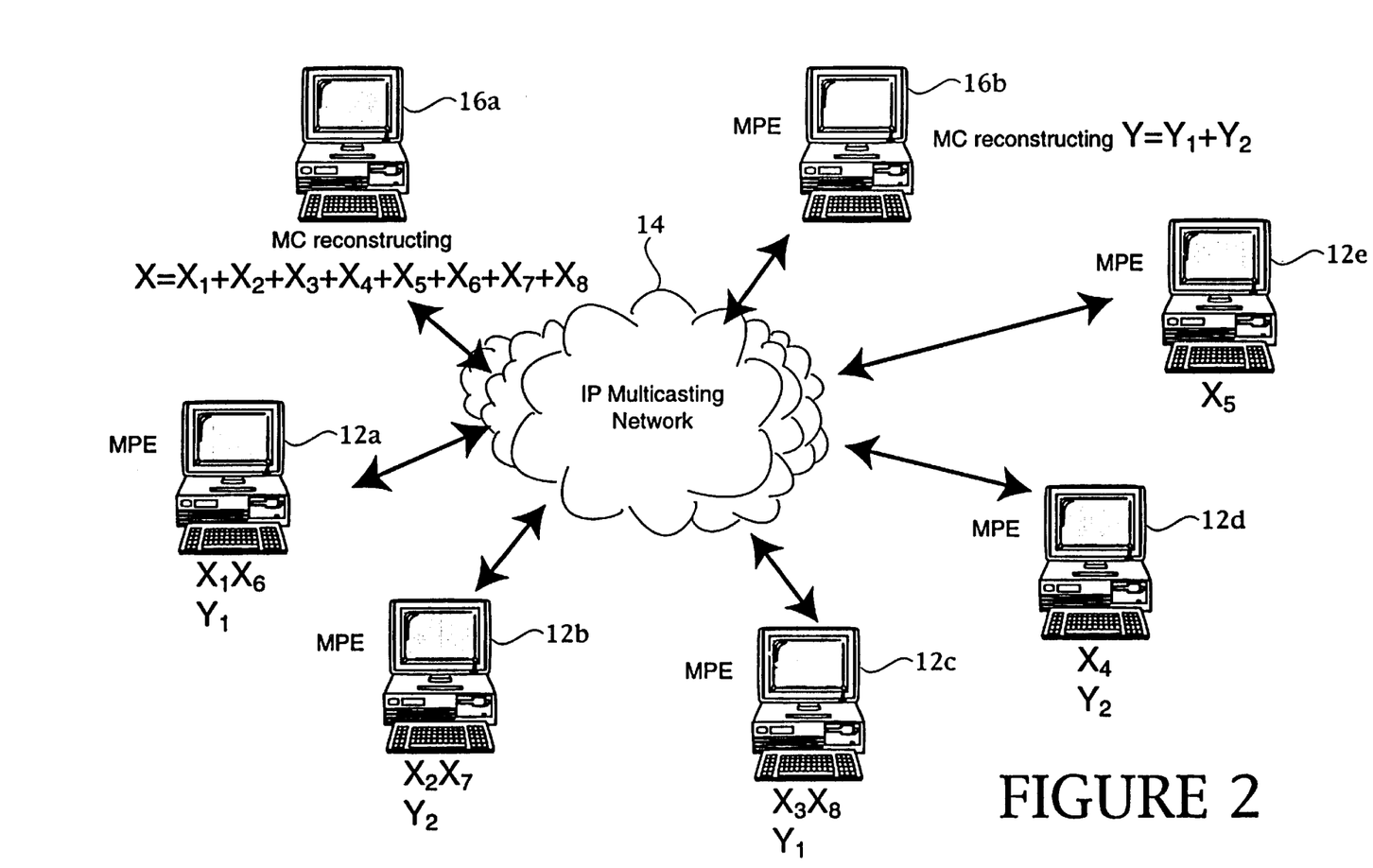
FIG. 2 is a detailed network datagram showing how two different data streams (X and Y) are distributed across the network using non-hierarchial multiple description coding.

FIG. 2 shows in greater detail how the multiple description coding works. In FIG. 2, two multimedia streams, designated X and Y are stored across a plurality of media push engines. These streams are broken into substream components, designated by subscripts, $X_1, X_2, \ldots, X_n; Y_1, Y_2, \ldots Y_n$. Note that the substream components stored across the plurality of media push engines are not necessarily the same for each engine. Thus media push engine 12a stores components $X_1$, $X_6$ and $Y_1$. Similarly, media push engine 12b stores components $X_2$, $X_7$ and $Y_2$.

The multimedia clients reassemble the data stream of interest by summing the proper substream components in the proper order. Thus multimedia client 16a reconstructs stream X as illustrated, while multimedia 16b constructs stream Y as illustrated. At the multimedia client it matters not that individual substream components arrive through different paths from different media push engines.

Figure 3:
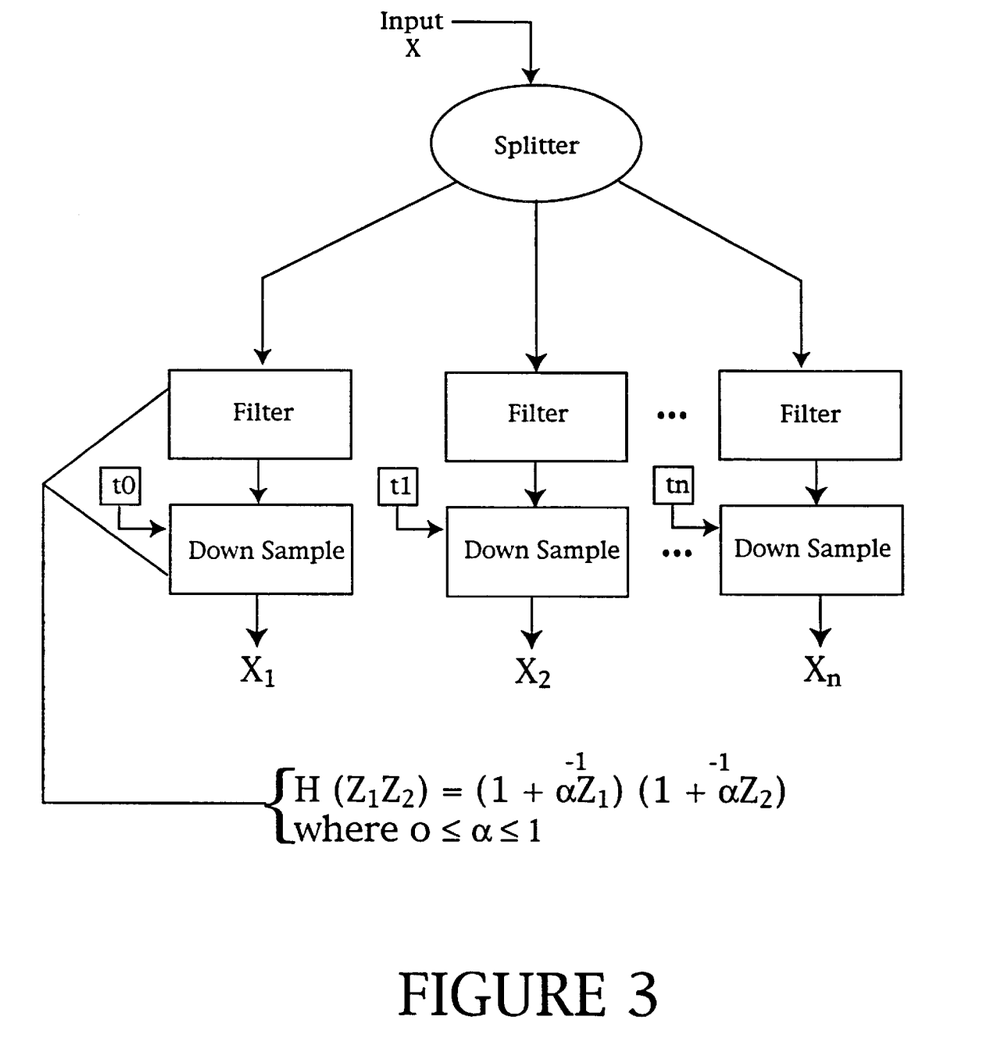
FIG. 3 is a data flow diagram illustrating one embodiment of multiple descriptive coding (MDC)

The presently preferred multiple description coding scheme is constructed as illustrated in FIG. 3. The original multimedia data stream (e.g. video and/or audio data) is decomposed into multiple subsignals and then each subsignal is independently compressed. As noted above, the decomposition is non-hierarchial, such that an acceptable signal can be recovered from any one subsignal, an incremental improvement can be realized by additional subsignals, and a perfect reconstruction is achieved when all subsignals are received exactly. Moreover, it is preferable to maximize the overall compression gain so long as the above three criteria are met.

One way to decompose the original signal is to construct each subsignal as a reduced resolution representation of the original signal. This may be done, as illustrated, by submitting the original signal through a low pass filter followed by downsampling. The subsignals thus differ only in the sampling positions. If desired, such decomposition can be obtained by a filter bank that includes the pre-filter and its shifted versions.

The pre-filter should be selected to suppress the aliasing components in the downsampled subsignals. This helps to reduce the bit rates required for coding the subsignals and to enable an acceptable image recovery from a single subsignal.

The pre-filter should further be selected so that it does not completely eliminate the high frequency components. Were the high frequency components entirely eliminated, there would be no way to recover those components in the original signal, even when all subsignals are present. Thus the filter should suppress, but not entirely eliminate, the high frequency components.

Mathematically, reconstruction of the substream components into a reconstructed stream involves inverting the matrix equation relating the samples in all the substreams and the samples in the original stream. Typically this may involve a large matrix equation, with inversion employing a large amount of computation and memory space. One way to address this computational burden is to use a block recursive reconstruction method. At each step in the recursive process a block of 2×2 samples in the original stream is recovered based on up to four corresponding samples in the received subcomponent streams. Of course, other computational techniques may be employed to accomplish the same result. For more information on coding and encoding in a non-hierarchial fashion using multiple description coding, see "Robust Image Coding and Transport in Wireless Networks Using a Non-Hierarchial Decomposition," Yao Wang and Doo-man Chung. Mobile Multimedia Communications; Goodman (Plenum Press)

Figure 4:
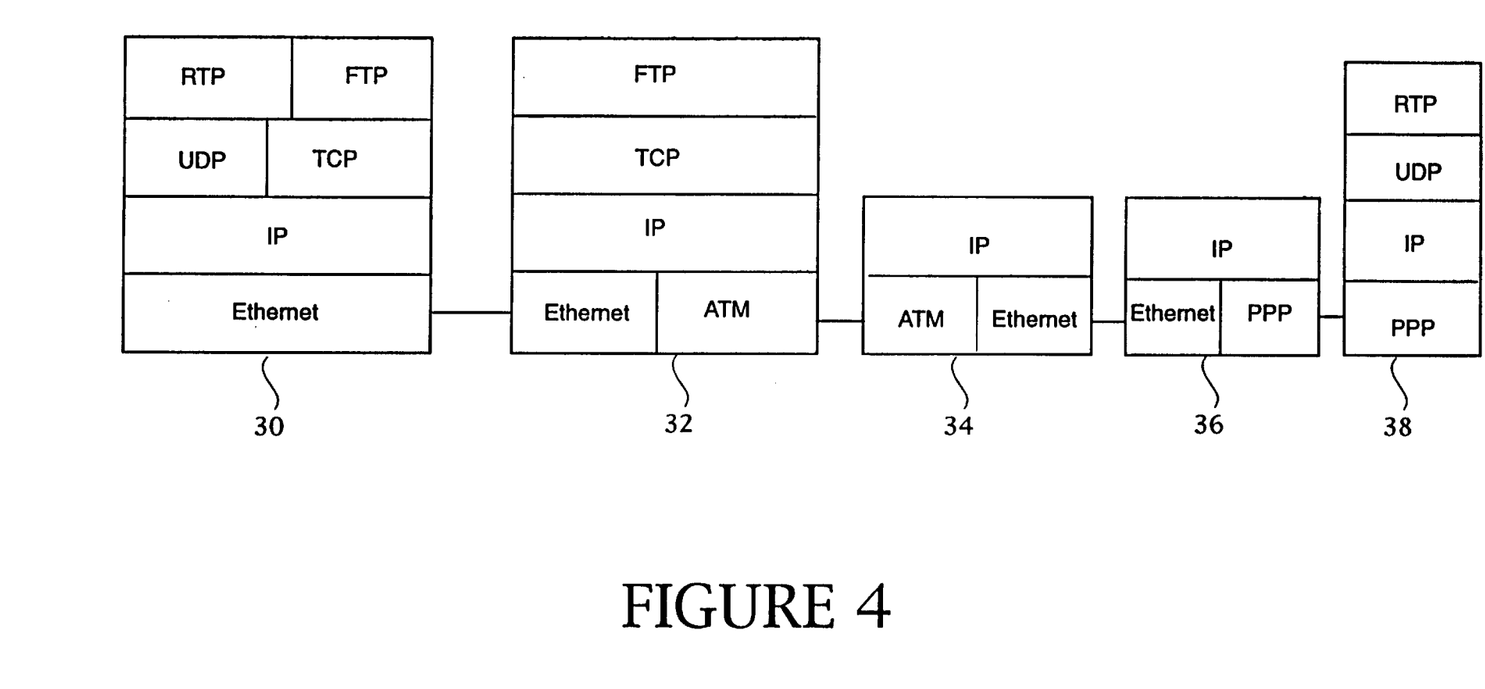
FIG. 4 is a layer datagram illustrating the TCP/IP architecture and also showing how the RTP architecture may be integrated into an IP-based system.
Figure 5:
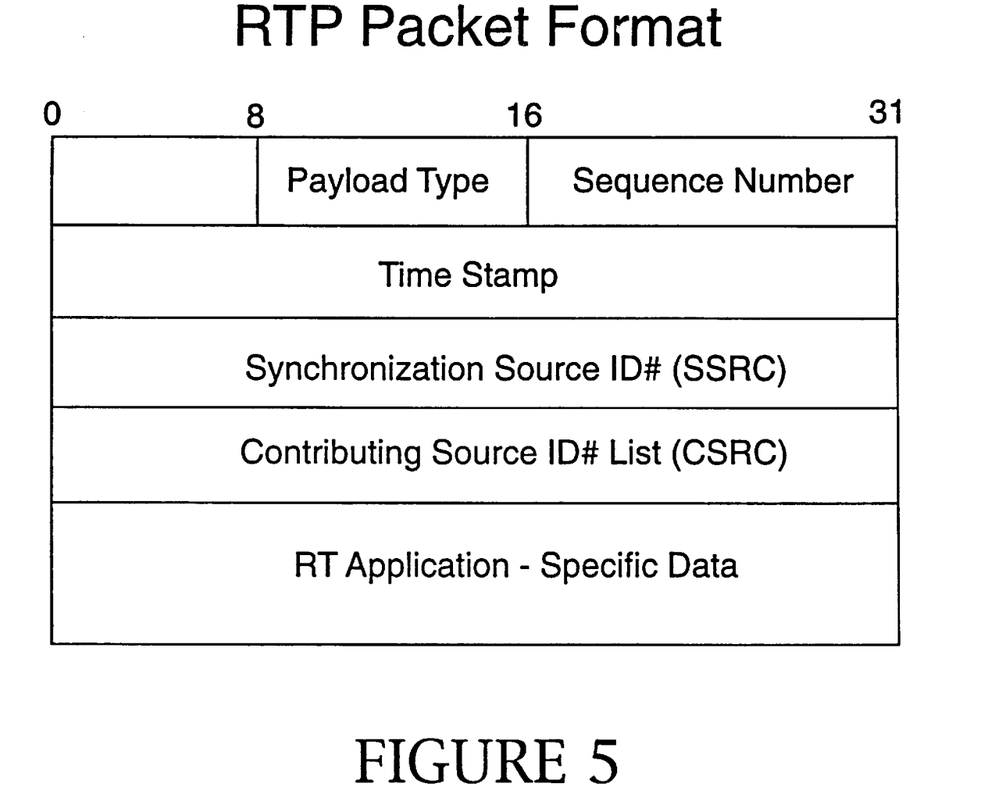
FIG. 5 is a detailed format datagram illustrating the packet format according to the Real-time Protocol (RTP)

The MDC-coded substreams are delivered over the multicasting network as datagrams using the Real-Time Protocol (RTP) for content delivery and the Real-Time Protocol (RTCP) to implement flow control. These protocols are able to naturally coexist with the popular TCP/IP protocol used by many Internet applications. FIG. 4 presents a review of these protocols through an example of how five entities might communicate with one another. In FIG. 5 entities 30–38 communicate with each other using the layered architecture popularized by the Internet. It will, of course, be understood that FIG. 4 is intended only to show how the presently preferred Real-Time Protocol (RTP) integrates in one possible architectural scheme. Although the Real-Time Protocol is presently preferred, this is not intended as a limitation of the invention in its broader aspects. On the contrary, other message delivery protocols may be suitably used.

In FIG. 4 each of the communicating entities 30–38 has been illustrated as a layered architecture, with the physical layer at the bottom and the application layer at the top. Entity 30 communicates with entity 32 using the Ethernet Protocol at the physical level. Entity 32 and entity 34 communicate at the physical level using the ATM Protocol. In a like fashion, entity 34 communicates with entity 36 using the Ethernet Protocol, and entity 36 communicates with entity 38 using the PPP Protocol. Again, the physical layer communication protocols selected for illustration here are not intended as a limitation upon the invention as set forth in the appended claims.

Above the physical layer is the Internet Protocol (IP) layer. The IP Protocol isolates the physical or transport layer from the application layer. The IP Protocol supports connectionless communication in which packets of information are sent and received as datagrams. Note that in the illustrated example of FIG. 4 all communicating entities are using the IP Protocol.

One layer above the IP Protocol two different higher level protocols have been illustrated, the TCP Protocol and the UDP Protocol. Again, the illustrations are intended only as one example of a possible configuration. The UDP Protocol or User Datagram Protocol represents a simple transport protocol. It makes no attempt to preserve the sequence of messages it delivers. The TCP Protocol or Transmission Control Protocol provides a higher level of reliability, yet insures that datagrams are delivered in the proper sequence. The TCP Protocol uses an acknowledgment system to insure that all datagrams are delivered in the proper sequence. The TCP Protocol includes a mechanism for retransmitting packets that have not been acknowledged. This acknowledgment/retransmit technique guarantees proper packet delivery, but it does not guarantee packet delivery in real-time. Thus TCP Protocol is usually unsuitable for delivering real-time data such as multimedia video and/or audio data.

The Real-Time Protocol (RTP) replaces the more sophisticated Transport Protocol of TCP with a simple framework that applications can use directly. Instead of implementing a missing data detection and retransmission mechanism—which can introduce transmission delays—the RTP Protocol simply ignores missing data. The RTP Protocol is also not typically concerned with the sequence of packet delivery. The protocol assumes that the application layer above it will correct any misordered data. The RTP Protocol is compatible with a number of different encoding standards, such as MPEG, JPEG and H.261.

In the illustrated example of FIG. 4, entities 30 and 38 are both running RTP Protocol. Thus streaming data could be supplied from entity 30 to entity 38 through the network consisting of entities 30, 32, 34, 36 and 38.

The RTP Protocol is designed for multicast operation. Multicasting is a form of message broadcasting in which messages may be delivered to many different recipients in a designated set. Multicast addresses identify sets of interfaces, frequently including multiple interfaces belonging to different systems. When a message has a multicast destination address, the network strives to deliver it to all interfaces in the set. This function lets a system generate a message once and have that message delivered to many different recipients.

Aside from delivering the datagram packets to multiple recipients, a multicasting network will typically also support feedback from the message recipients. Typically all participants in the multicasting group session can receive these feedback messages. Such feedback messages are commonly used for real-time traffic control, following a related Real-Time Control Protocol (RTCP). In some respects, RTCP is an optional extension to RTP. RTCP packets are used by the presently preferred embodiment to send flow control and session management information among the entities participating in the group multicast session.

FIG. 5 illustrates the RTP packet format. Note that the packet includes a sequence number and time stamp used in reassembling the packets in the proper time sequence.

Figure 6:
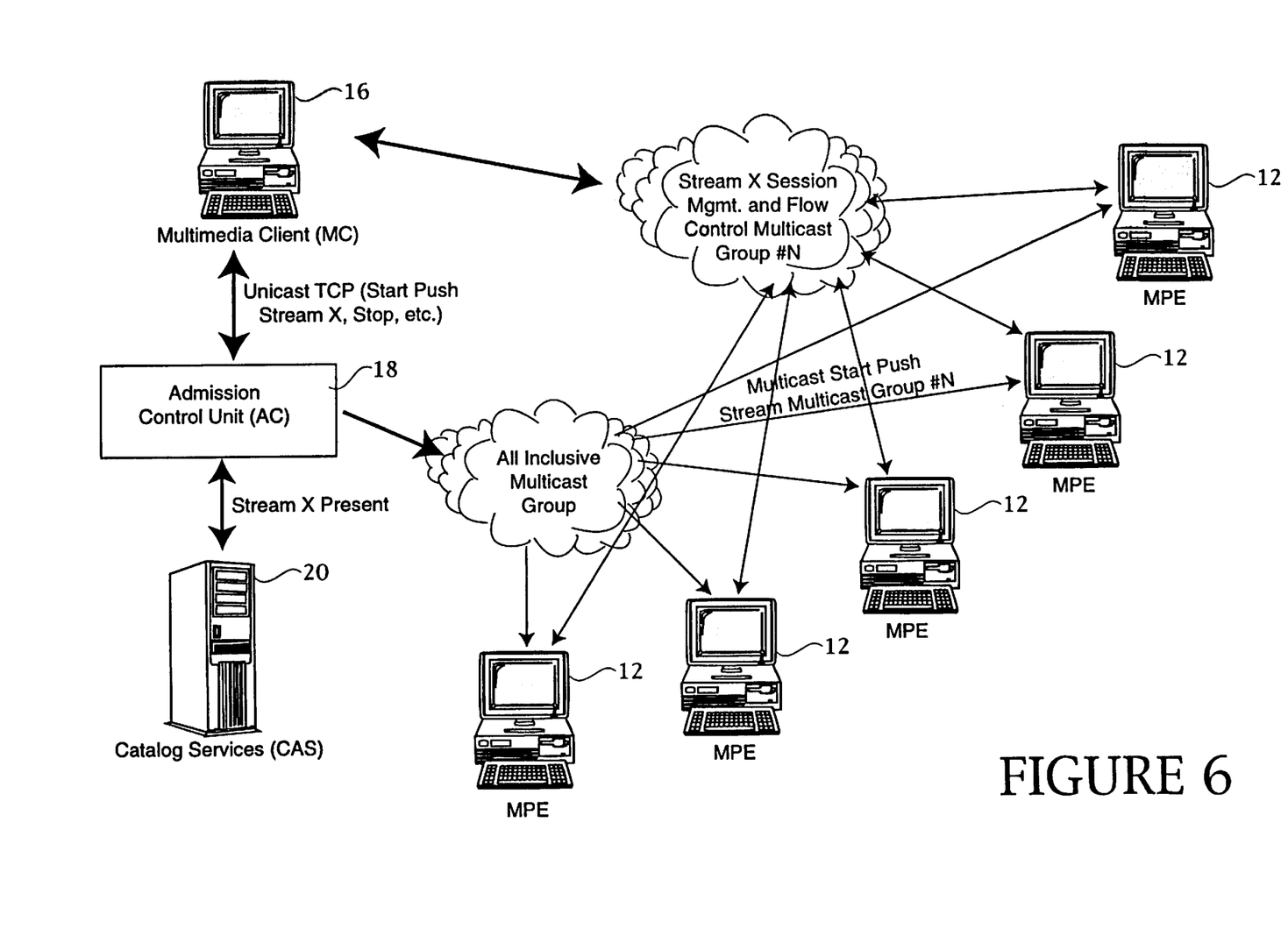
FIG. 6 is a network datagram illustrating the call admission and session management according to the invention.
Figure 7:
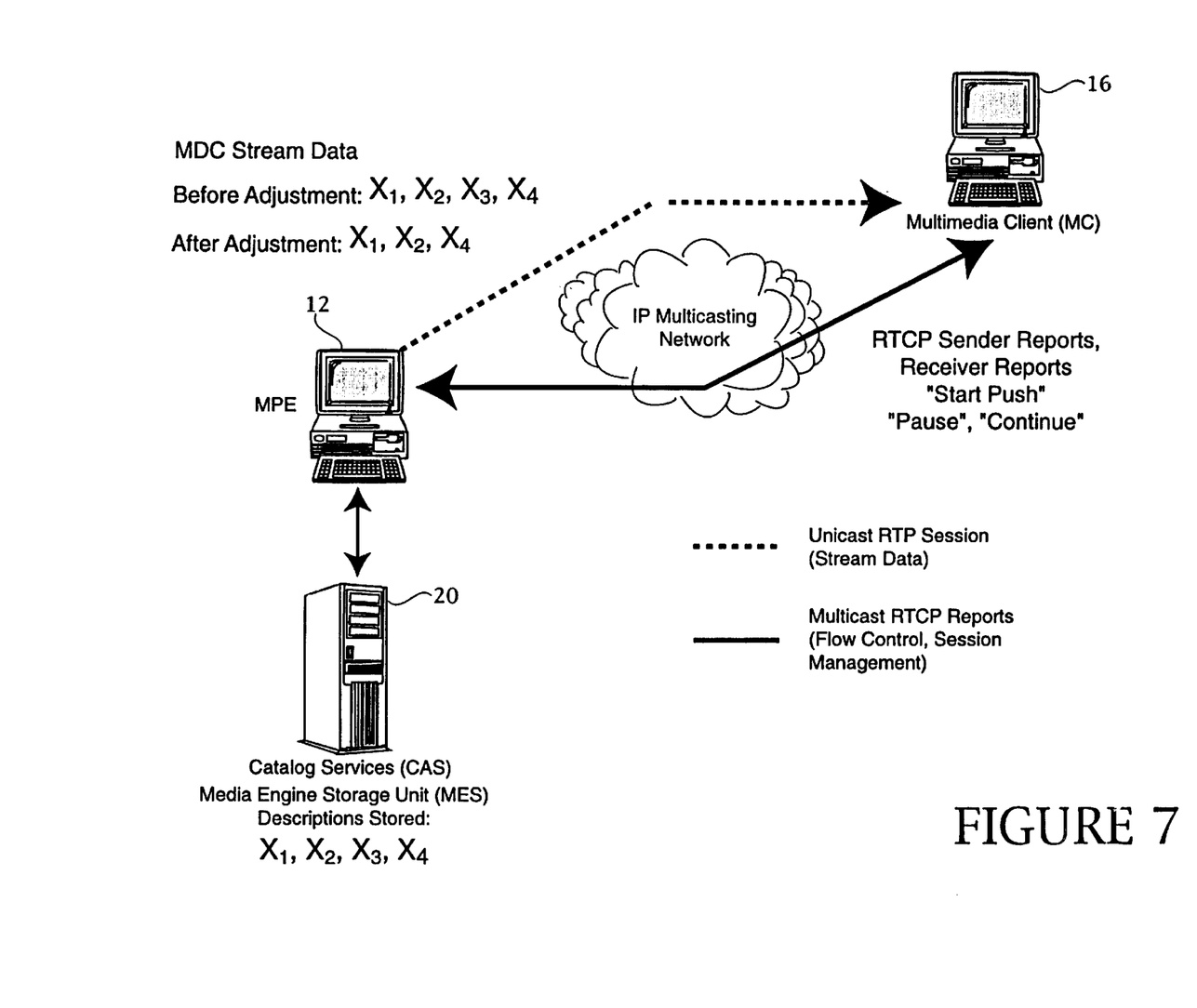
FIG. 7 is a detailed network datagram showing information flow between a media push engine and a multimedia client over the multicasting IP network.

FIGS. 6 and 7 show the details of how the multimedia client, admission control unit and media push engines communicate with one another during a multicast group session. Specifically, FIG. 6 shows the basic message flow and communication sequence of the preferred embodiment. FIG. 7 gives a more detailed view of how the RTP and RTCP Protocols are used in routing the substream component datagrams from media push engine to multimedia client.

Referring first to FIG. 6, the multimedia client 16 sends a unicast TCP Protocol message to the Admission Control Unit 18, requesting that a particular media selection commence delivery. The Admission Control Unit 18 consults its catalog services system 20 to determine if the requested selection (i.e. requested stream) is present on the network. Assuming the stream is present, the Admission Control Unit transmits a Stream Open message to those Media Push Engines 12 that have at least some substream components of the requested selection. This Open Stream request is sent to all Media Push Engines. Those Media Push Engines that find themselves capable of serving the requested stream components jointly enter the multicasting session management and flow control session between only those hosts serving and receiving that specific stream. Participating Media Push Engines and participating multimedia clients obtain the needed multicast address for such control multicast group session from the Admission Control Unit. Thereafter, the Admission Control Unit effectively drops out of the session, allowing subsequent session management and flow control messages to be exchanged only among multicast group members (that is, the multimedia client and all corresponding media push engines). This reduces the overhead on the Admission Control Unit 18.

The Admission Control Unit generates a multicast Class D address for use by the multicast session. This address may be selected from a pool of available multicast address entries. The Admission Control Unit is thus responsible for managing the allocation of multicast addresses. When a multicast session is ended the Admission Control Unit returns the multicast session address back to the pool of available addresses.

Thus once the multicast group session is initiated, those media push engines able to supply substream components will do so by sending unicast RTP session stream data to the multimedia client 16. Through the RTCP Protocol these media push engines may communicate with one another to join or depart a multicast group session, as needed to maintain a high quality of service.

Referring to FIG. 7, the media push engine and multimedia client communicate through the network at two different levels. As illustrated by the dotted lines, a unicast RTP session transmits the multimedia streaming data to the multimedia client. Concurrently, as required, the media push engine and multimedia client send each other RTCP reports, specifically sender reports and receiver reports as well as any appropriate flow control commands and other session management commands (e.g. Start Push, Pause, Continue). The RTCP control signals are shown by the bidirectional solid line in FIG. 7.

Essentially, after the Stream Open message is sent by the Admission Control Unit, each mediapush engine consults its associated media storage system to determine whether it is capable of serving the requested stream components. If so, then the media push engine joins the specified multicast group. Otherwise it does not participate in the multicast session (unless later requested). Once the media push engine has joined the multicast group, it participates in communications using the RTCP Protocol whereby statistics of sent data and received data are exchanged among the members of the group. As noted above, the Admission Control Unit does not need to participate in these communications and hence it will remain dormant unless a request for another session is made or until the current session is requested to be terminated.

Effectively, the system implements a distributed Admission Control System, where the participating members of the group collectively and distributively make the admission control decisions. One benefit of this distributed approach is that the invention can incorporate intelligent mechanisms to prevent network congestion and to improve quality of service, despite the fact that the multicasting network is a best effort network with no guaranteed real-time delivery.

Best effort networks, particularly those lacking sophisticated traffic and user control policies, experience frequent congestions. Such congestions can result in a loss of or substantial delay of real-time data. As previously discussed, real-time data that is delivered late is effectively treated as not delivered. The continuous influx of data into a congested node of the network tends to make the congestion even worse. The present invention uses RTCP sender reports and received reports on time-sensitive transmissions as an indication that a given node may need to scale back on the number of components it is transmitting when congestion is detected.

FIG. 4 illustrates how this may be accomplished. The multimedia client 16 has requested the X real-time data stream, consisting of sub-stream components $X_1$, $X_2$, $X_3$ and $Y_4$. Assume that Media Push Engine 12 in FIG. 7 is experiencing local traffic congestion such that sub-stream components are arriving late at the multimedia client 16. The multimedia client's RTCP receiver report notifies the Media Push Engine 12 (and all other media push engines participating in the group session) that some percentage of the component data from Media Push Engine 12. Media Push Engine 12 analyzes these reports and stops sending a selected component, in this case the $X_3$, thereby decreasing the amount of traffic flowing through its point of congestion.

Thus, after adjustment, Media Push Engine 12 supplies only components $X_1$, $X_2$ and $X_4$ to the multimedia client. As the other media push engines participating in the group session receive the same sender and receiver reports, the loss of the $X_3$ component from Media Push Engine 12 may be compensated for if other push engines are able to supply this missing component. Otherwise, the quality of service will be slightly degraded as discussed above.

Figure 8:
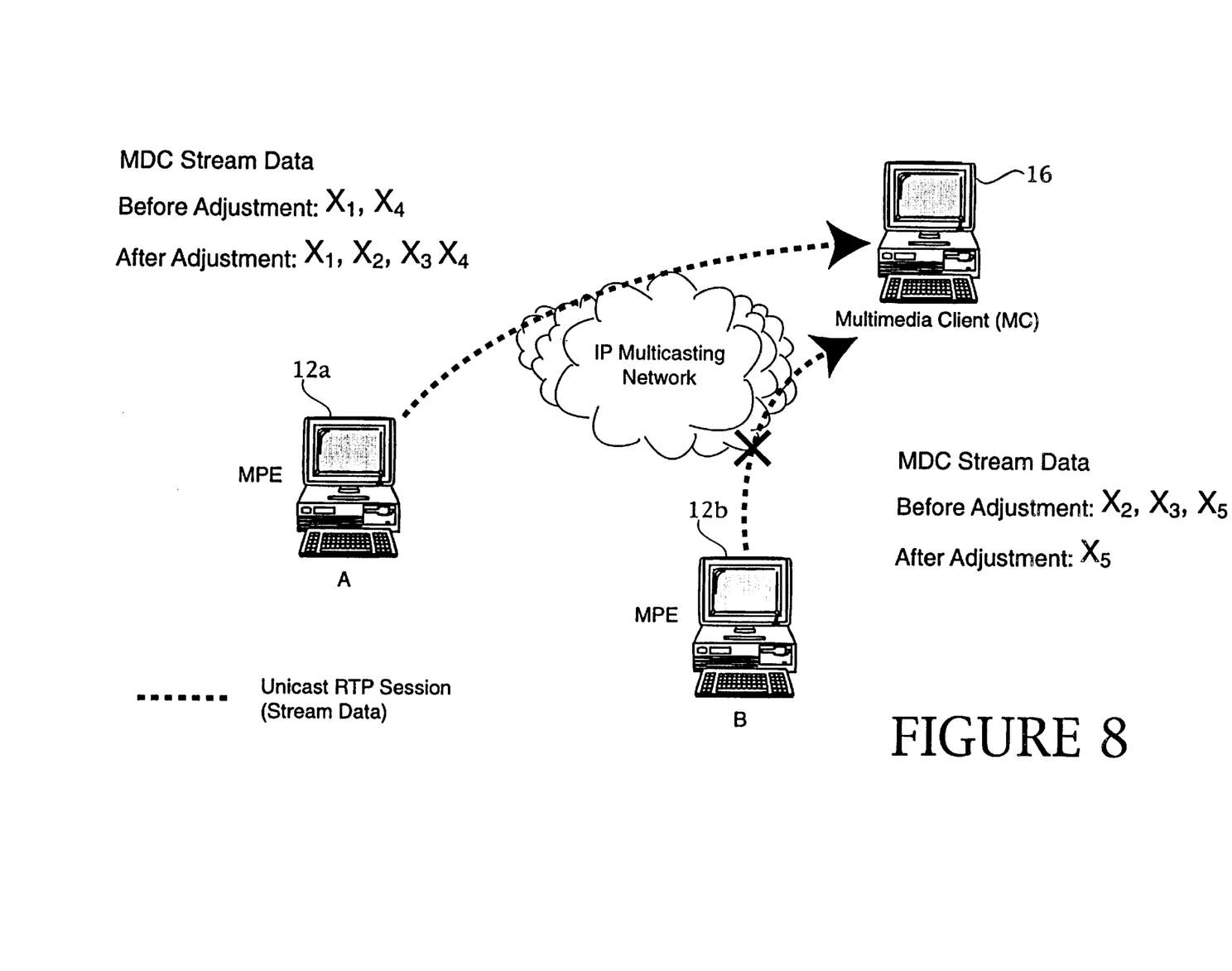
FIG. 8 is a network datagram illustrating the process of source component server redistribution.

FIG. 8 illustrates how the data stream may be effectively redistributed by making local adjustments to the substream components being sent. In the illustrated example assume that there is local congestion somewhere in the data path that supplies substream components from Media Push Engine 12b. The RTCP sender and receiver reports will thus indicate that some portion of the components previously sent to the multimedia client 16 by Media Push Engine 12b are lost or delayed due to local congestion. In the illustrated example the lost components happen also to be present in the storage system of Media Push Engine 12a. Media Push Engine 12a can either retransmit the lost component payloads to the multimedia client or simply adjust the set of components to be transmitted in future real-time data transactions. In the case where lost payloads are retransmitted by another media push engine, sufficient buffering should be supplied at the multimedia client to allow the missing components to be reassembled with the previously delivered components before the stream is reconstructed and presented to the user. In the case where the system merely alters the component set for future transmissions, such change constitutes a scalable server component redistribution mechanism. This mechanism promotes improved quality of service by improving the presentation of stream data to the multimedia client.

Figure 9:
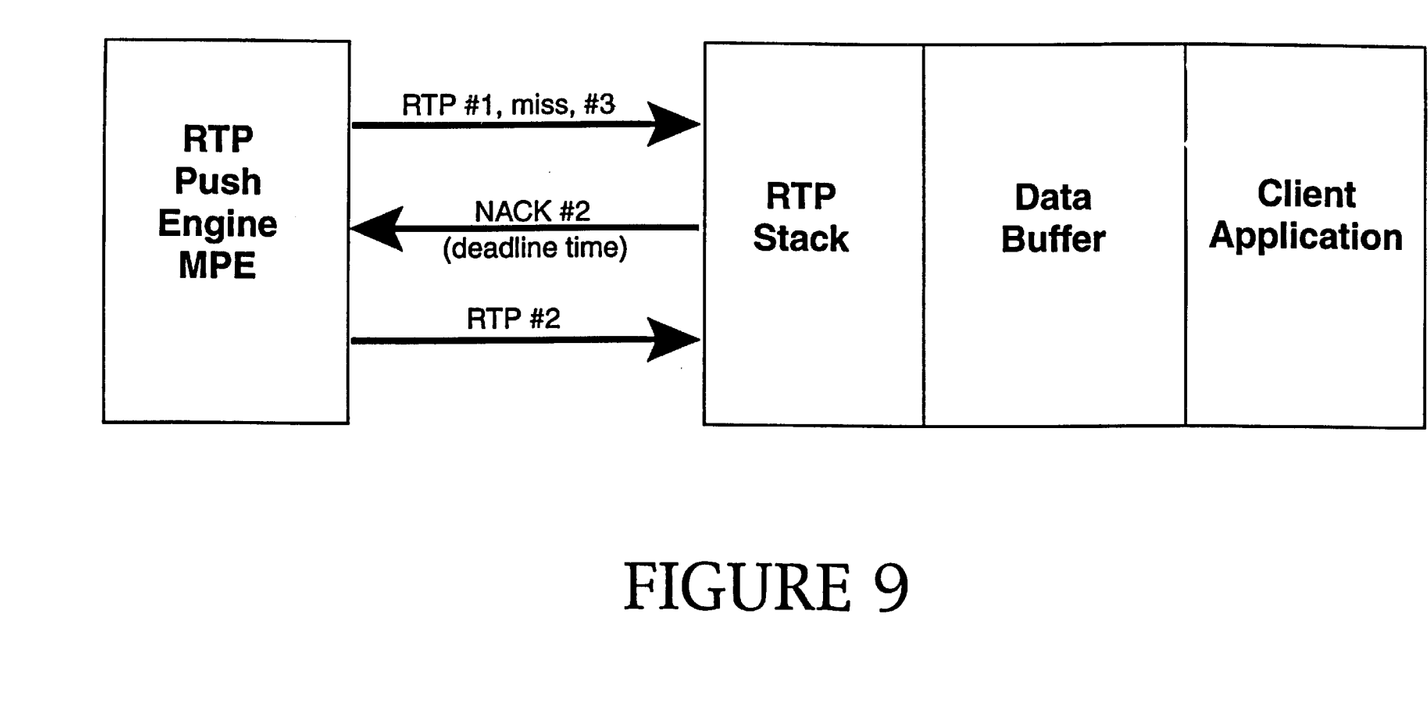
FIG. 9 is a protocol datagram showing how the Real-time Protocol (RTP) may be modified to increase its reliability.

Although the embodiment described above is generally suitable for most media delivery applications, there are some systems that cannot tolerate even a slight degradation in quality. Such systems include high quality broadcast video distribution. In these more demanding applications, the system of the previously described preferred embodiment can be modified to employ an additional reliability mechanism for the real-time component. In this case the Real-Time Protocol may be modified or augmented to allow retransmissions of lost real-time payloads. This "Reliable RTP" is illustrated in FIG. 9. The Media Push Engine communicates to the RTP stack using Real-Time Protocol. In this case assume that the first and third components are received but the second component is missing. There is an immediate negative acknowledgment (NACK) from the RTP stack, telling the Media Push Engine that the second payload was not received. The Media Push Engine then retransmits the needed payload and the RTP stack places the needed payload into the correct location within the data buffer. The client application then reads the data from the data buffer. Any duplicate packets are dropped and any excessively delayed packets may also be dropped.

From the foregoing it will be understood that the invention provides a media delivery system architecture that employs a distributed, networked technique for delivering streaming data over a best effort network. The architecture may be readily scaled, larger or smaller, as the server's complexity increases linearly with the number of clients. The architecture is thus a fully distributed, tightly coupled parallel architecture that is capable of providing simple and yet robust service.

Through the use of multiple description coding (MDC) and multiple path transport, the invention can provide a high quality of service without resorting to delay-producing transmission retry techniques. Thus the invention will readily work with existing Real-Time Transport Protocol (RTP) for data transport and Real-Time Control Protocol (RTCP) for session management, rate adaptation and the like. When congestion is encountered the presentation can be downscaled without interruption, thanks to the multiple description coding and the manner in which participants of a group session can be added to or removed from the group. The flow control of streams is also controllable through these same mechanisms to prevent or reduce network congestion once it is detected.

The invention is therefore ideally suited for delivery of multimedia selections as well as video and audio streaming data. The invention will readily support data streams of multiple bit rates and it is capable of providing services at both constant bit rates and variable bit rates.

While the invention has been described in its presently preferred embodiments, it will be understood that the invention is capable of certain modification and change without departing from the spirit of the invention as set forth in the appended claims.

What is claimed is:

1. A distributed media delivery system for delivering media selections to a media client over a multicasting network, comprising:

a plurality of media push engines accessible through said network, said push engines each having associated media storage unit for storing streaming data representing the media selections available for delivery;

said media storage units being configured to store said streaming data as a non-hierarchical set of substream components capable of being reconstituted into a reconstructed stream from fewer than all of said components, such that the higher the number of components used in reconstitution, the higher quality the reconstructed stream; and an admission control system accessible through said network, said admission control system including a catalog for storing the identity of the media selections available for delivery by each of said media push engines, said admission control system being operative, in response to a request for a given media selection from a media client, to open a multicast group session among said media client and at least a portion of said media push engines having the given media selection available for delivery, whereby said media push engines participating in said multicast group session each supply to said network those substream components corresponding to the given media selection, for delivery to and reconstitution by said media client.

2. The media delivery system of claim 1 wherein said admission control system includes an admission control unit that maintains a pool of multicast session addresses for use in invoking multicast group sessions and wherein said admission control unit assigns a designated multicast session address, selected from said pool, for use by said multicast group session.

3. The media delivery system of claim 2 wherein said admission control unit is further operative, in response to a request from said media client to end a multicast group session, to return said designated multicast session address to said pool.

4. The media delivery system of claim 2 wherein said media client and said media push engines participate in said multicast group session exchange flow control messages without involving said admission control unit.

5. The media delivery system of claim 1 wherein at least a portion of said substream components are replicated across first and second media push engines and wherein said delivery system further comprises congestion handling system for identifying one of said first and second media push engines as the cause of congestion and for automatically invoking the other of said first and second media push engines to participate in said multicast group session.

6. The media delivery system of claim 5 further comprising data buffering system associated with said media client for storing substream components prior to reconstitution.

7. The media delivery system of claim 1 wherein said admission control system is a distributed system defined at least in part through interaction between said media push engines.

8. The media delivery system of claim 1 wherein said media push engines communicate with said network over different communication paths.

9. The media delivery system of claim 1 wherein said network is a connectionless network offering best effort delivery services.

10. The media delivery system of claim 1 wherein said network is the Internet.

11. The media delivery system of claim 1 wherein said media client and said media push engines participating in said multicast group session employ Real-Time Transport Protocol (RTP) for data transport.

12. The media delivery system of claim 1 wherein said media client and said media push engines participating in said multicast group session employ Real-Time Control Protocol (RTCP) for session management.

13. The media delivery system of claim 1 wherein at least a portion of said substream components are replicated across several media push engines.

14. The media delivery system of claim 1 wherein said admission control unit is further operative, in response to a request from said media client to end a multicast group session, to instruct all media push engines participating in said multicast group session to terminate the session.

15. The media delivery system of claim 1 wherein between said media client and every media push engine participating in said multicast group session there is a unicast flow of datagrams containing real-time stream component data.

* * * * *